United States Patent
Huang

(10) Patent No.: US 11,255,383 B2
(45) Date of Patent: Feb. 22, 2022

(54) MODULAR MOTOR ASSEMBLY STRUCTURE

(71) Applicant: Delta Electronics, Inc., Taoyuan (TW)

(72) Inventor: Zi-Xuan Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 448 days.

(21) Appl. No.: 16/460,167

(22) Filed: Jul. 2, 2019

(65) Prior Publication Data

US 2020/0224726 A1 Jul. 16, 2020

Related U.S. Application Data

(60) Provisional application No. 62/791,624, filed on Jan. 11, 2019.

(30) Foreign Application Priority Data

Apr. 15, 2019 (CN) .......................... 201910300202.0

(51) Int. Cl.
*F16D 1/08* (2006.01)
*F16D 1/12* (2006.01)
*H02K 7/00* (2006.01)

(52) U.S. Cl.
CPC .............. *F16D 1/0894* (2013.01); *F16D 1/12* (2013.01); *H02K 7/003* (2013.01)

(58) Field of Classification Search
CPC ........ F16D 1/0894; F16D 1/12; F16D 1/0876; F16D 1/0882; Y10T 403/7018; Y10T 403/7035; Y10T 403/585; Y10T 403/587
See application file for complete search history.

(56) References Cited

U.S. PATENT DOCUMENTS

| | | | | |
|---|---|---|---|---|
| 1,397,530 A | * | 11/1921 | Lubeck | ...... F16D 3/58 464/83 |
| 2,041,123 A | * | 5/1936 | Föppl | ...... F16B 3/00 403/356 |
| 2,681,239 A | * | 6/1954 | Gillen | ...... F16D 1/0882 403/356 |

(Continued)

FOREIGN PATENT DOCUMENTS

| CN | 1379187 A | 11/2002 |
|---|---|---|
| CN | 203756529 U | 8/2014 |

(Continued)

*Primary Examiner* — Daniel J Wiley
(74) *Attorney, Agent, or Firm* — Kirton McConkie; Evan R. Witt

(57) ABSTRACT

A modular motor assembly structure is disclosed and configured to couple with a drive shaft of an application device. The drive shaft includes a receiving slot. The modular motor assembly includes a main body and a combination key. The main body includes a shaft hole and a key groove. The shaft hole includes an opening and a central axis. The key groove is disposed on a side wall around the shaft hole and parallel to a central axis of the shaft hole. The combination key has a front end and a rear end. When one end of the drive shaft is inserted into the shaft hole along the central axis of the shaft hole, the combination key is at least partially accommodated in the receiving slot, and the front end faces the key groove. The combination key has a continuously increasing thickness from the front end to the rear end.

16 Claims, 18 Drawing Sheets

(56) References Cited

U.S. PATENT DOCUMENTS

| | | | | |
|---|---|---|---|---|
| 3,378,285 A | * | 4/1968 | Staley | F16D 1/093 |
| | | | | 403/358 |
| 3,722,929 A | * | 3/1973 | Gilman | F16D 1/0876 |
| | | | | 403/359.6 |
| 4,615,639 A | * | 10/1986 | Seireg | F16D 1/0876 |
| | | | | 403/356 |
| 4,702,636 A | * | 10/1987 | Guile | B63B 21/502 |
| | | | | 403/24 |

FOREIGN PATENT DOCUMENTS

| | | |
|---|---|---|
| JP | B 1951001415 | 3/1951 |
| JP | S5174674 U | 6/1976 |
| JP | S5947107 U | 3/1984 |
| JP | H11313460 A | 11/1999 |
| TW | 177772 | 2/1992 |
| TW | M563112 U | 7/2018 |

\* cited by examiner

MODULAR MOTOR ASSEMBLY STRUCTURE

CROSS-REFERENCE TO RELATED APPLICATION

This application claims the benefit of U.S. Provisional Application No. 62/791,624 filed on Jan. 11, 2019, and entitled "MODULAR MOTOR ASSEMBLY STRUCTURE", the entirety of which is hereby incorporated by reference.

FIELD OF THE INVENTION

The present invention relates to a motor assembly structure, and more particularly to a modular motor assembly structure.

BACKGROUND OF THE INVENTION

In a conventional motor assembly structure for an application device, a straight-through module is generally used to connect with the client application device. The main purpose of utilizing the straight-through module is to shorten the overall length and reduce the cost of the coupling components between the motor assembly structure and the application device. Furthermore, the straight-through module facilitates to increase the rigidity transmission and the response speed of the motor, and it benefits to increase the accuracy of use. Generally, in the connection of the straight-through module, an assembly tolerance adjustment and a specific installation process have to be performed for ensuring a smooth operation and accuracy. However, professional skill is required to achieve the connection of the straight-through module successfully. It is difficult for general users to complete the connection of the straight-through module, which makes the conventional motor assembly fail to achieve the purposes of modularization.

Therefore, there is a need of providing a modular motor assembly structure to overcome the above drawbacks of assembly and modularization, and to improve the application of modular motor assembly structure.

SUMMARY OF THE INVENTION

An object of the present invention is to provide a modular motor assembly structure. The main body of the modular motor assembly structure is slightly mutated. By modularizing the mounting shaft hole with standard interface size in the motor assembly structure, a wide range of users can directly connect the motor assembly structure with the application device or the corresponding equipment. It benefits to meet the requirements of the market and be adjustable according to the existing market. Moreover, the common mounting components, such as the couplings, the motor flanges and so on, are omitted. Thus, the purposes of reducing assembly length and simplifying assembly procedures are achieved.

Another object of the present invention is to provide a modular motor assembly structure. With the geometric profile of the specially designed combination keys, the functions of eliminating the problem of mounting tolerances, facilitating the installation and transmitting the rigidity of rotating power can be achieved. The assembly structure and the assembly method are simplified. The function of the transmitting the rigidity between the modular motor assembly structure and the client application device is achieved. In addition, the special structural design of the combination key can provide the functions of elastic cushioning and adjusting tolerances by disposing the groove and the surface inclined at an angle, which can effectively improve the convenience of assembly, and ensure the functions of rigid connection and elastic cushioning to eliminate the problem of tolerances. Consequently, zero backlash is achieved. It is beneficial to achieve the effects of high precision and rapid response. Thus, the modular motor assembly structure of the present disclosure is more suitable for various rotating components, such as driving screws, pulleys, gears, reducers and so on, in the application device.

In accordance with an aspect of the present invention, a modular motor assembly structure is provided. The modular motor assembly structure is configured to connect to a driving shaft of an application device. The driving shaft includes a receiving slot, and the modular motor assembly structure includes a main body and a combination key. The main body includes a shaft hole and a key groove. The shaft hole is spatially corresponding to the driving shaft of the application device and includes an opening and a central axis. The driving shaft of the application device has an end configured to be inserted into the shaft hole through the opening of the shaft hole along the central axis of the shaft hole. The key groove is disposed on a side wall around the shaft hole, in communication with the shaft hole and extended along a direction parallel to the central axis. The combination key is spatially corresponding to the receiving slot of the application device and has a front end and a rear end. When the driving shaft is inserted into the shaft hole, the combination key is at least partially accommodated in the receiving slot, and the front end faces the key groove. The combination key has a continuously increasing thickness from the front end to the rear end.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
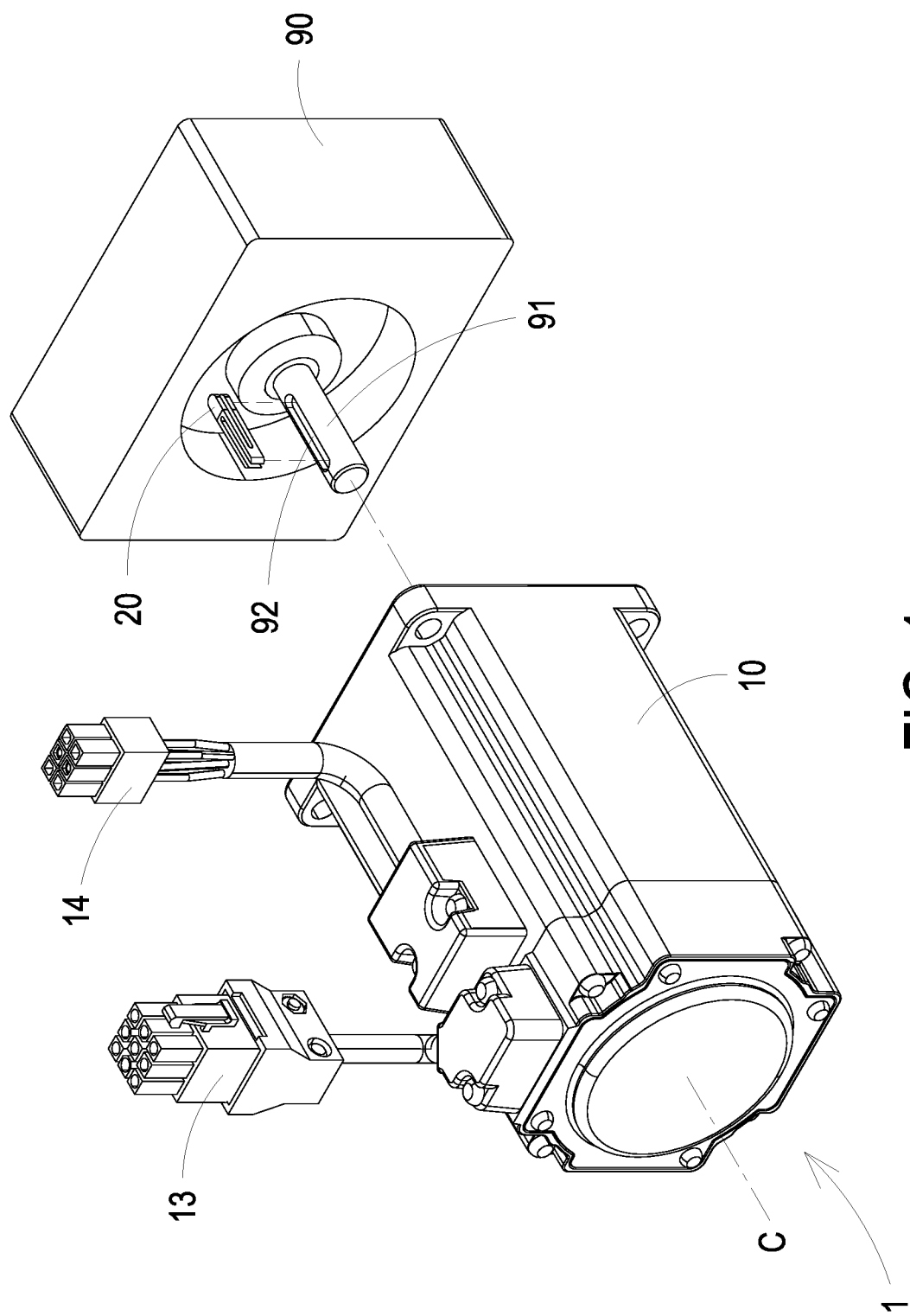
FIG. 1 is a perspective structural view illustrating a modular motor assembly structure and a corresponding application device according to a first preferred embodiment of the present invention.
Figure 2:
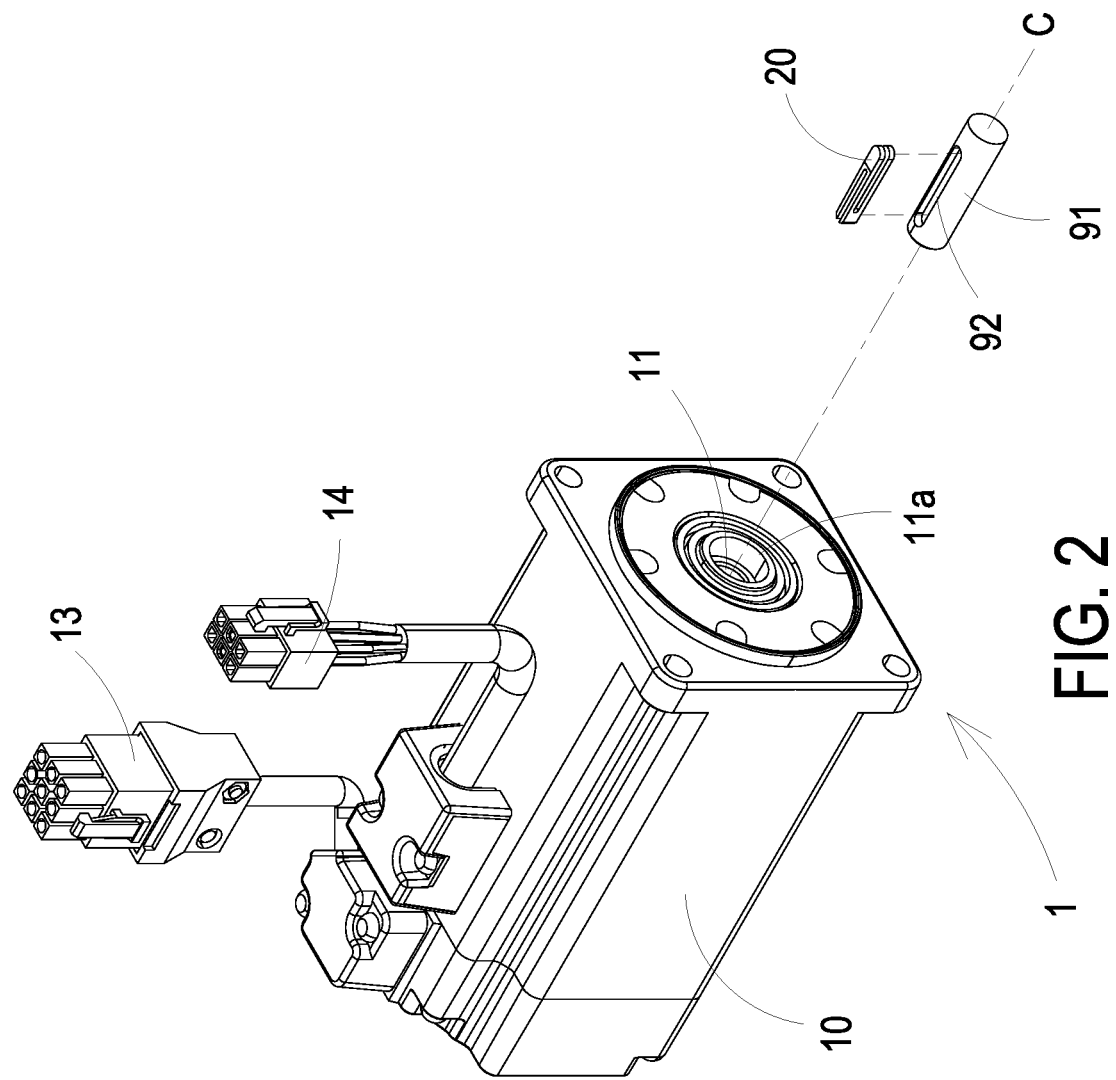
FIG. 2 is a perspective structural view illustrating the modular motor assembly structure and the corresponding application device according to the first preferred embodiment of the present invention and taken at a different observation angle.
Figure 3:
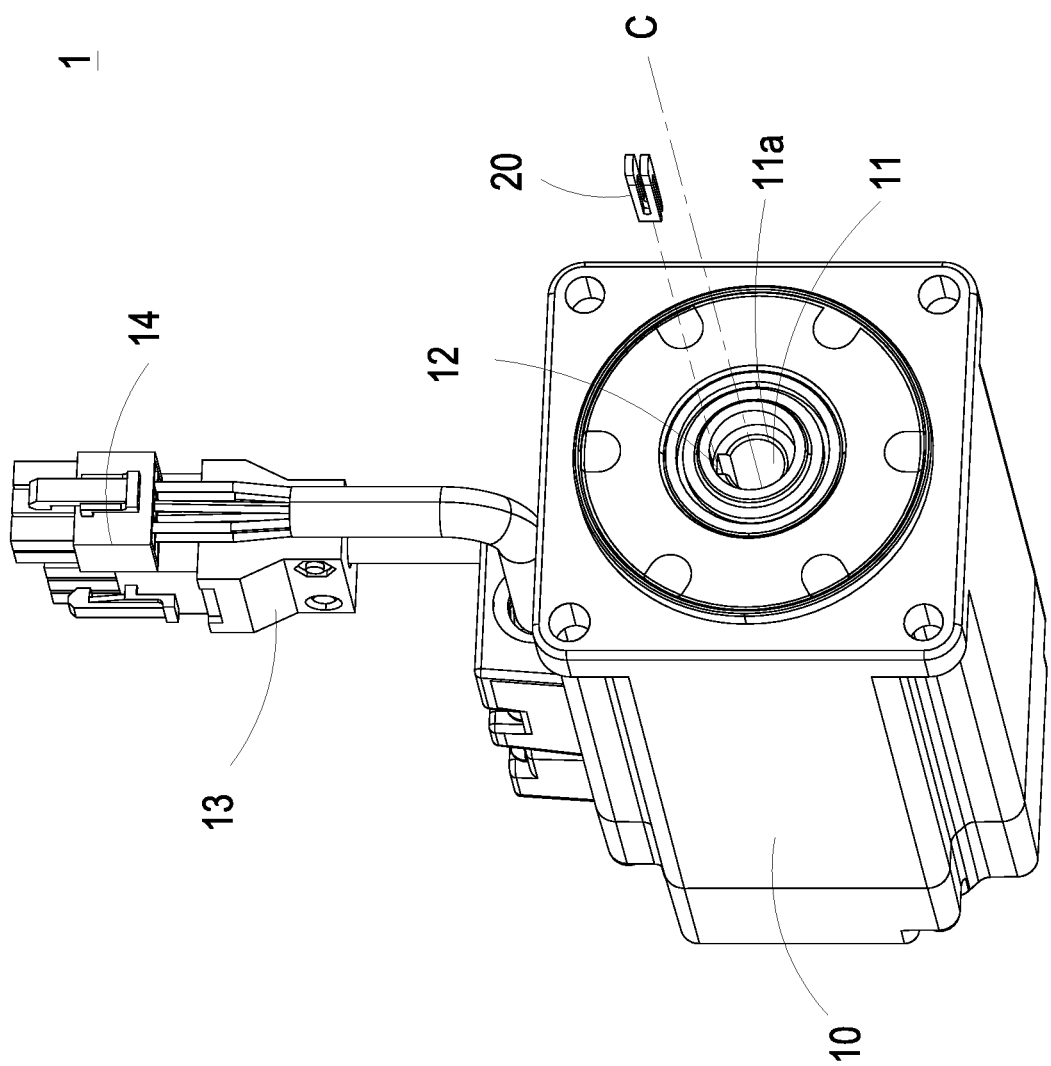
FIG. 3 shows relationship of the main body and the combination key of the modular motor assembly structure according to the first preferred embodiment of the present invention.
Figure 4:
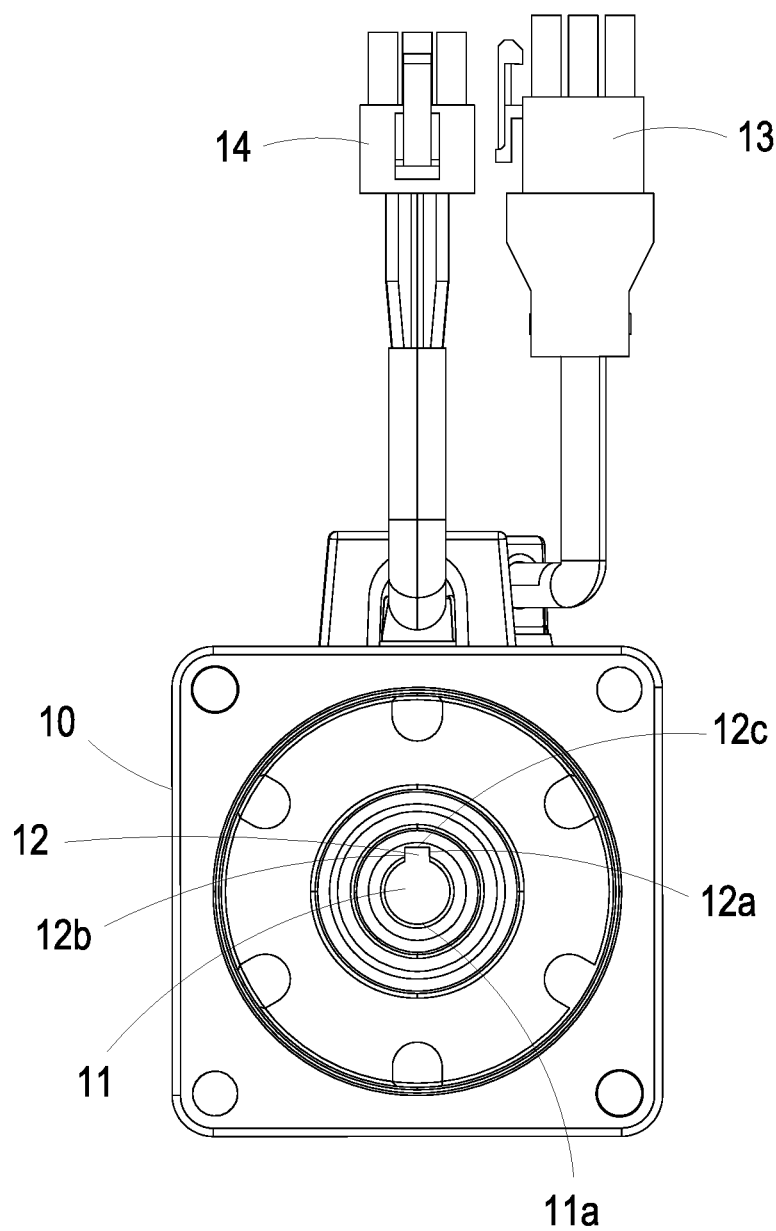
FIG. 4 is a front view illustrating the main body of the modular motor assembly structure according to the first preferred embodiment of the present invention.
Figure 5:
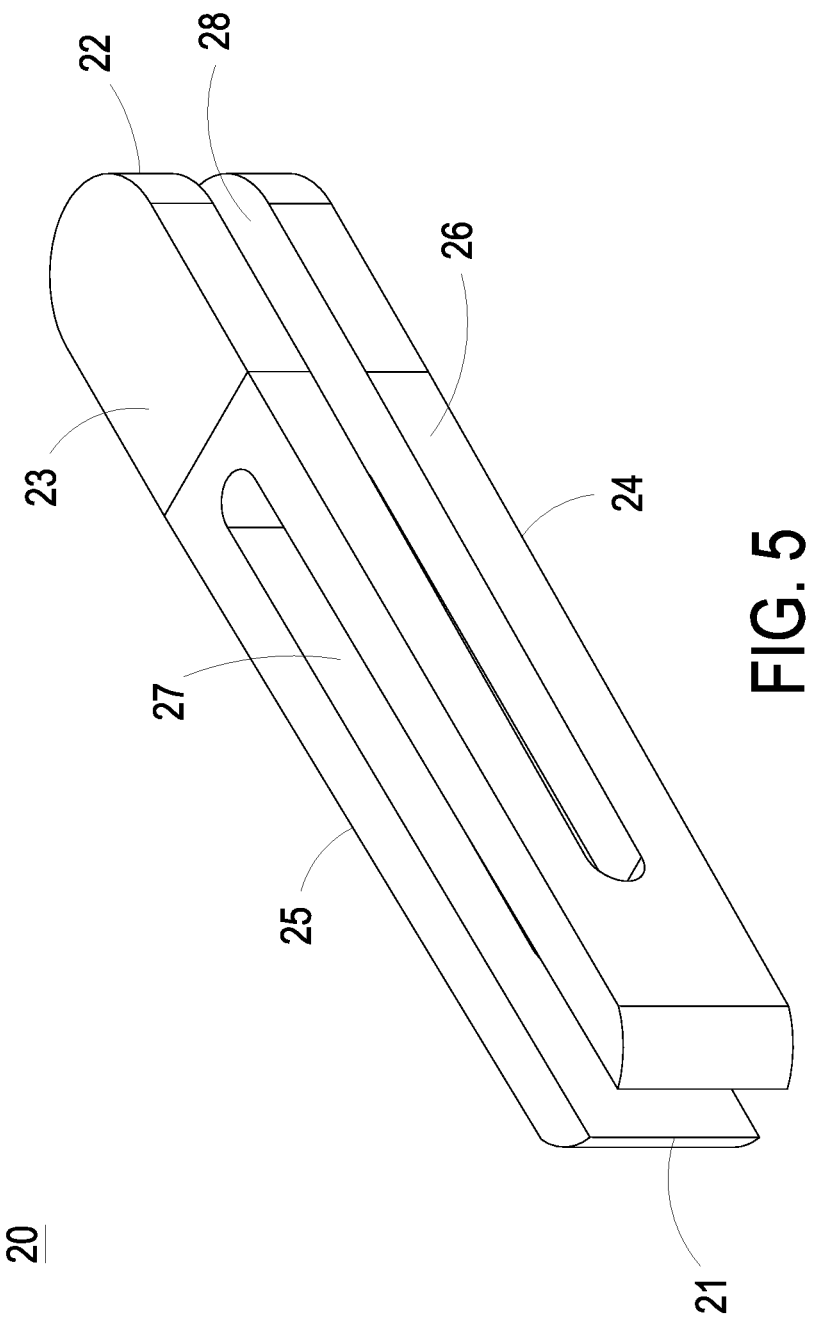
FIG. 5 is a perspective structural view illustrating the combination key of the modular motor assembly structure according to the first preferred embodiment of the present invention.
Figure 6:
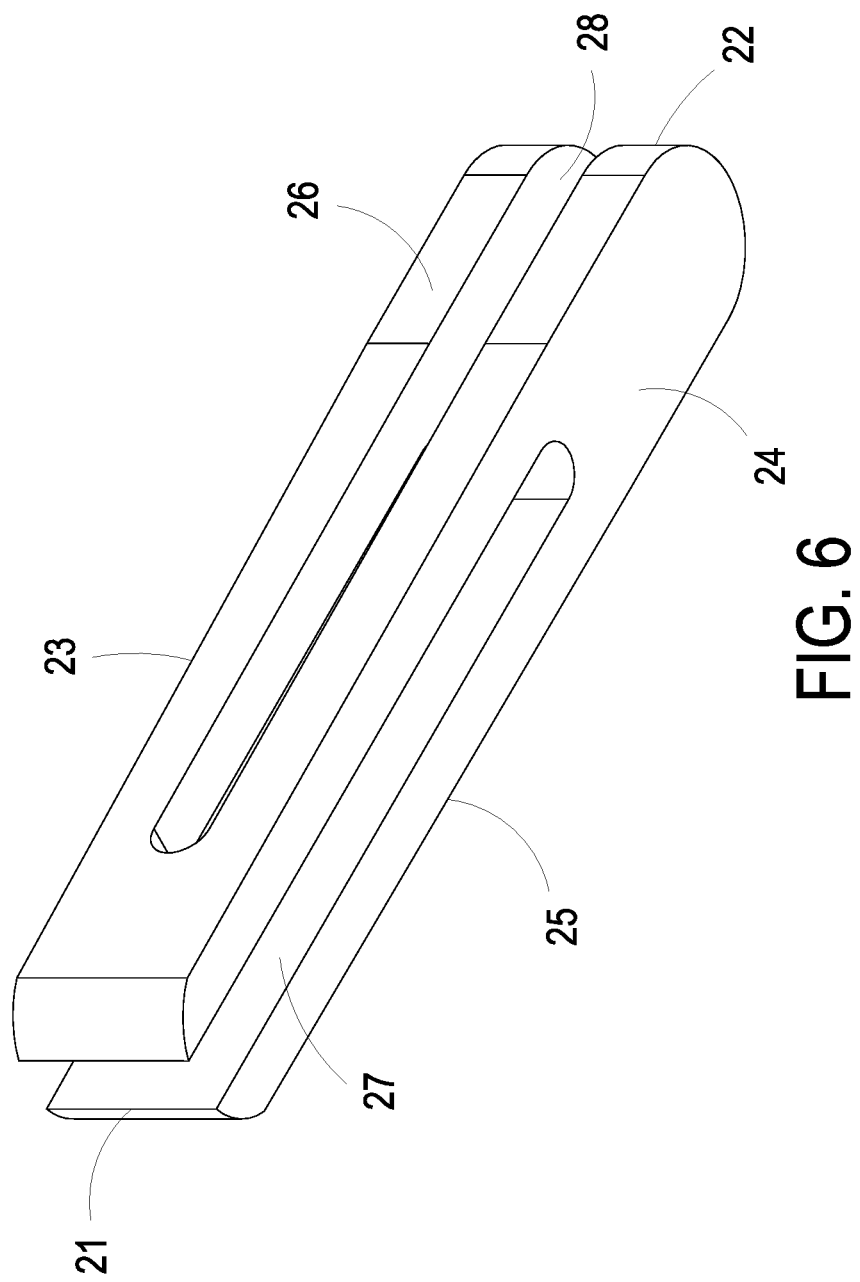
FIG. 6 is a perspective structural view illustrating the combination key of the modular motor assembly structure according to the first preferred embodiment of the present invention and taken at a different observation angle.
Figure 7:
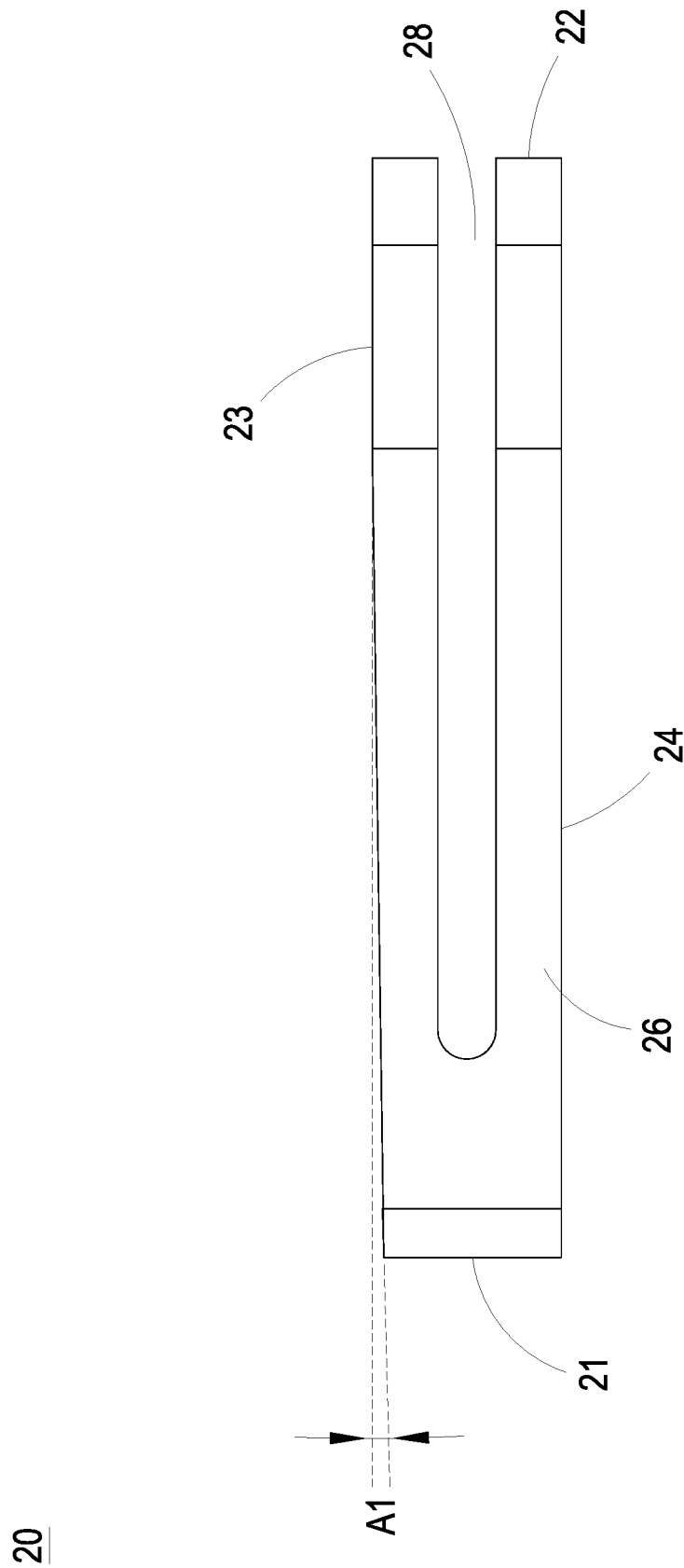
FIG. 7 is a lateral view illustrating the combination key of the modular motor assembly structure according to the first preferred embodiment of the present invention.
Figure 8:
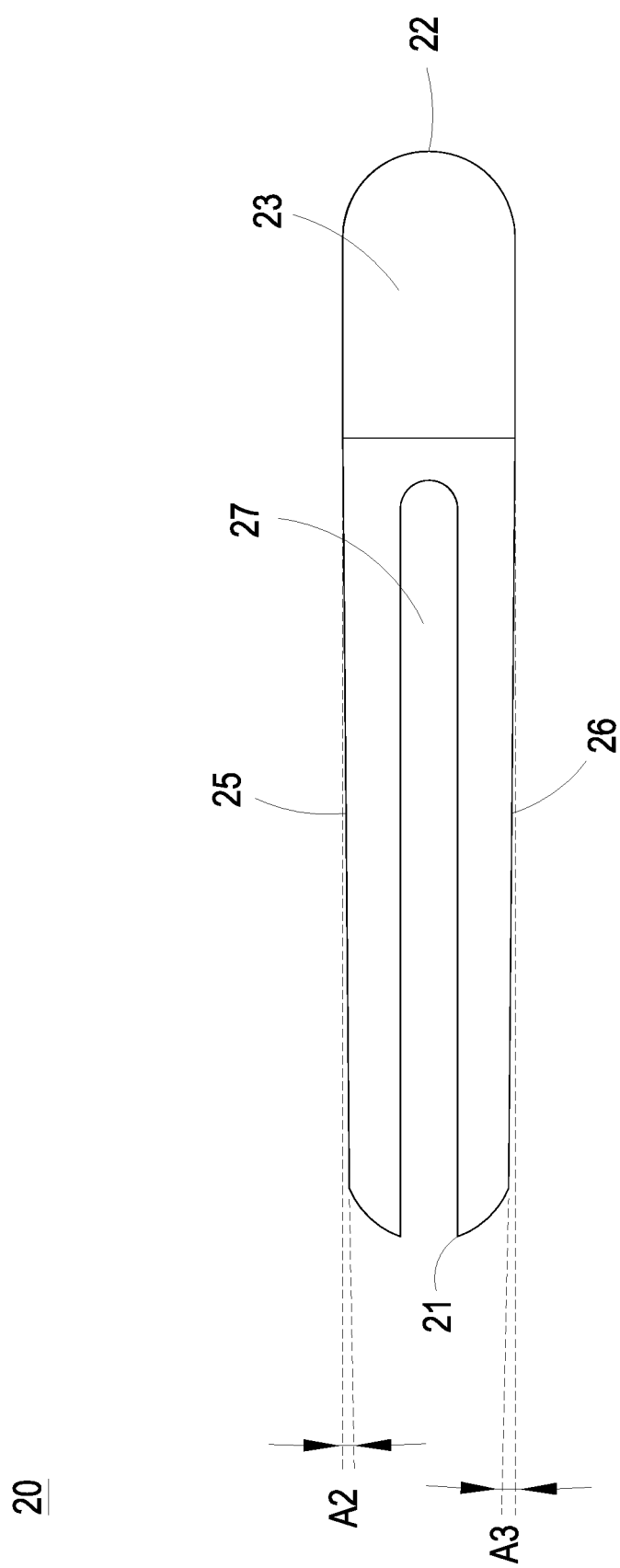
FIG. 8 is a top view illustrating the combination key of the modular motor assembly structure according to the first preferred embodiment of the present invention.
Figure 9:
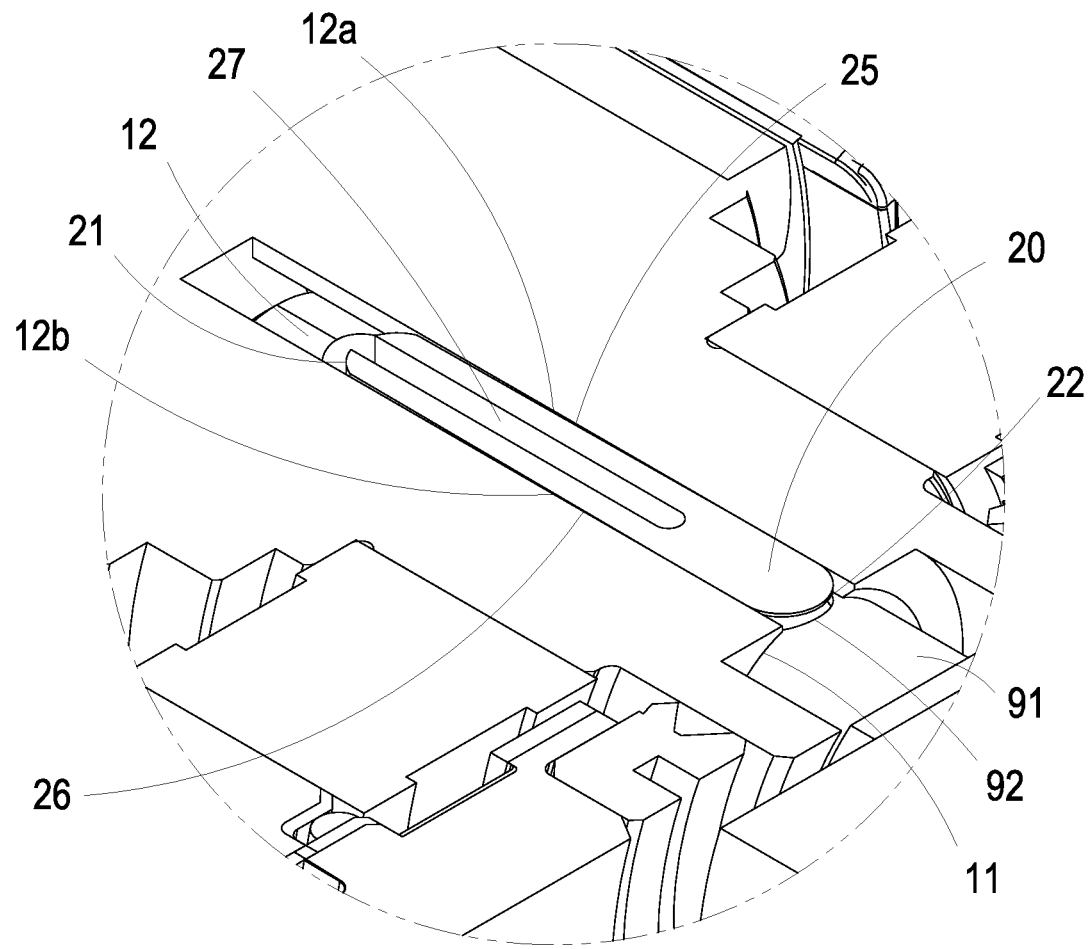
FIG. 9 is a horizontal cross-sectional view illustrating the modular motor assembly structure combined with the corresponding application device according to the first preferred embodiment of the present invention.
Figure 10:
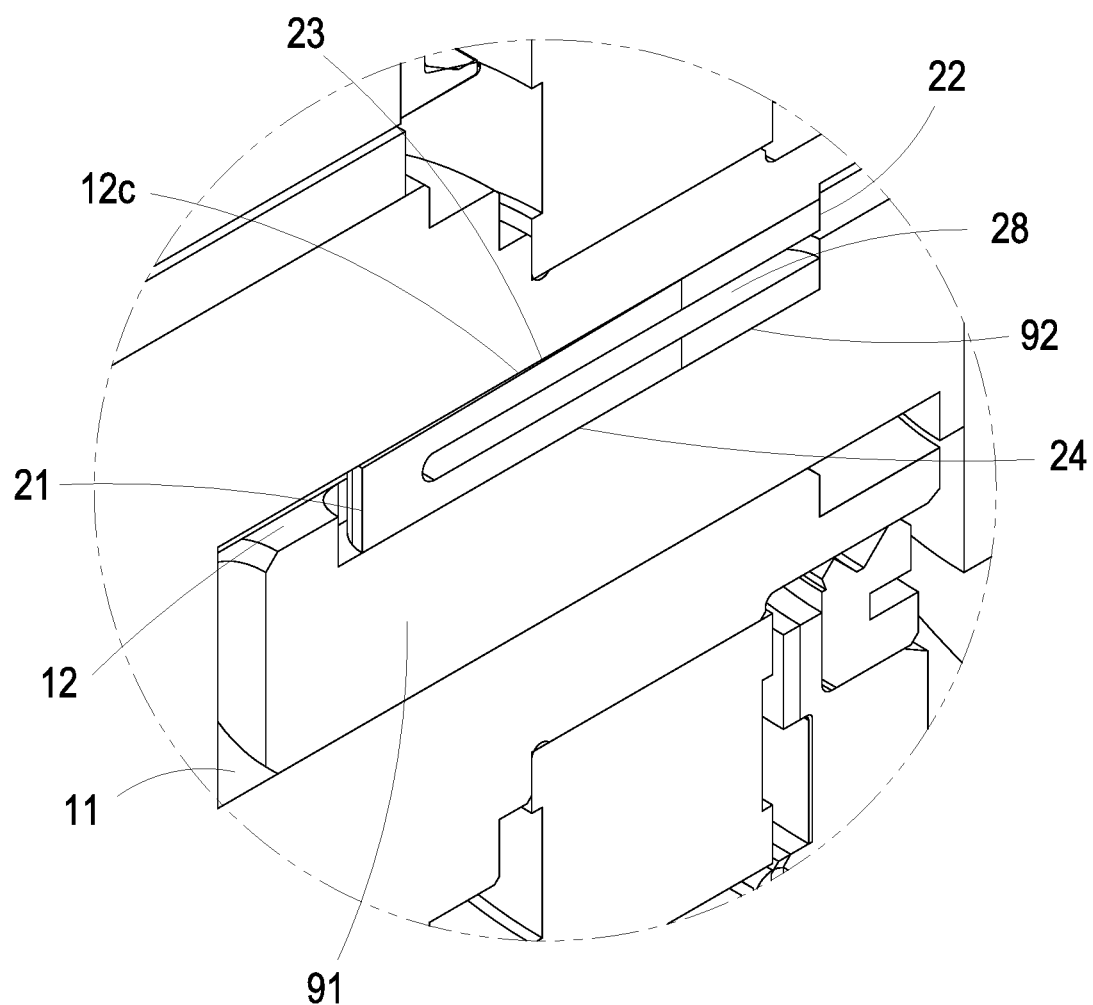
FIG. 10 is a vertical cross-sectional view illustrating the modular motor assembly structure combined with the corresponding application device according to the first preferred embodiment of the present invention.

FIGS. 1 and 2 are perspective structural views illustrating a modular motor assembly structure and a corresponding application device according to a first preferred embodiment of the present invention. FIG. 3 shows relationship of the main body and the combination key of the modular motor assembly structure according to the first preferred embodiment of the present invention. FIG. 4 is a front view illustrating the main body of the modular motor assembly structure according to the first preferred embodiment of the present invention. FIGS. 5 and 6 are perspective structural views illustrating the combination key of the modular motor assembly structure according to the first preferred embodiment of the present invention. FIGS. 7 and 8 are a lateral view and a top view illustrating the combination key of the modular motor assembly structure according to the first preferred embodiment of the present invention, respectively. FIGS. 9 and 10 are a horizontal cross-sectional view and a vertical cross-sectional view illustrating the modular motor assembly structure combined with the corresponding application device according to the first preferred embodiment of the present invention, respectively.

Please refer to FIGS. 1 to 3. In the embodiment, the modular motor assembly structure 1 includes a main body 10 and a combination key 20. The main body 10 further includes a shaft hole 11 and a key groove 12. Preferably but not exclusively, the shaft hole 11 is a motor shaft hole for power transmission, which is spatially corresponding to a driving shaft 91 of an application device 90 and configured to connect to the driving shaft 91 of the application device 90. The shaft hole 11 further has an opening 11a and a central axis C. One end of the driving shaft 91 is configured to be inserted into the shaft hole 11 through the opening 11a of the shaft hole 11 along the central axis C of the shaft hole 11. Namely, the shaft hole 11 matches with the driving shaft 91 of the application device 90 in the client end, so that the rotating power can be transmitted to the application device 90 through the driving shaft 91. In the embodiment, the cross section of the shaft hole 11 has a similar profile to the cross section of the driving shaft 91. In order to facilitate the driving shaft 91 to be inserted into the shaft hole 11, the cross-sectional area of the driving shaft 91 can be, for example, slightly smaller than the cross-sectional area of the shaft hole 11, but the present disclosure is not limited thereto. The key groove 12 is disposed on a side wall around the shaft hole 11, in communication with the shaft hole 11 and extended along a direction parallel to the central axis C of the shaft hole 11. Preferably but not exclusively, the key groove 12 is disposed on a top side wall around the shaft hole 11, but the present disclosure is not limited thereto. In other embodiments, the corresponding positions of the shaft hole 11 and the key groove 12 are adjustable according to the practical requirements, but not redundantly described herein.

In the embodiment, the driving shaft 91 of the application device 90 further includes a receiving slot 92, which is configured to partially receive the combination key 20. When the modular motor assembly structure 1 is combined with the application device 90, the combination key 20 is partially received in the receiving slot 92 on the driving shaft 91 of the application device 90, and the driving shaft 91 with the combination key 20 is correspondingly inserted into the shaft hole 11 and the key groove 12 of the main body 10. The cross section of the driving shaft 91 combined with the combination key 20 has a similar profile to the cross section of the shaft hole 11 communicated with the key groove 12. When the shaft hole 11 and the driving shaft 91 are combined with each other, the combination key 20 and the key groove 12 match to each other, so as to provide ease of guiding assembly. It is also ensured to achieve the function of rigid transmission of rotating power after the shaft hole 11 and driving shaft 91 are combined through the combination key 20. It is noted that the combination key 20 facilitates the combination of the shaft hole 11 and the driving shaft 91 and further provides function of adjusting the mounting tolerances between the shaft hole 11 and the driving shaft 91.

Please refer to FIGS. 5, 6, 7 and 8. In the embodiment, the combination key 20 is made of a metallic material and includes a front end 21, a rear end 22, a top surface 23, a bottom surface 24, a first lateral surface 25 and a second lateral surface 26. The front end 21 and the rear end 22 are opposite to each other. When the combination key 20 combined with the shaft hole 11 and the driving shaft 91, the front end 21 faces the key groove 12. The top surface 23 and the bottom surface 24 are opposite to each other. Preferably but not exclusively, the bottom surface 24 is a flat surface and configured to attach to a bottom of the receiving slot 92 of the driving shaft 91. The first lateral surface 25 and the second lateral surface 26 are opposite to each other and connected between the top surface 23 and the bottom surface 24. In the embodiment, the top surface 23 includes an inclined surface continuously increasing thickness from the front end 21 to the rear end 22, so as to form a first inclined angle A1. Namely, the top surface 23 between the front end 21 and rear end 22 is inclined at the first inclined angle A1. In addition, the first lateral surface 25 and the second lateral surface 26 include an inclined surface continuously increasing thickness from the front end 21 to the rear end 22, respectively, so as to form a second inclined angle A2 and a third inclined angle A3. The first lateral surface 25 between the front end 21 and the rear end 22 is inclined at the second inclined angle A2. The second lateral surface 26 between the front end 21 and the rear end 22 is inclined at the third inclined angle A3. Preferably but not exclusively, the first inclined angle A1, the second inclined angle A2 and the third inclined angle A3 are the same angle, for example 1°. The present disclosure is not limited thereto. In other embodiment, the first inclined angle A1, the second inclined angle A2 and the third inclined angle A3 are formed in partial segmentation of the top surface 23, the first lateral surface 25, and the second lateral surface 26, respectively. The present disclosure is not limited thereto and not redundantly described herein. On the other hand, the combination key 20 further includes a first groove 27 and a second groove 28. The first groove 27 is extended from the front end 21 toward the rear end 22 and located through a part of the top surface 23 and a part of the bottom surface 24. Preferably but not exclusively, the first groove 27 is located through more than half of the top surface 23 and half of the bottom surface 24. Namely, the length of the first groove 27 is greater than one-half of the length of the combination key 20. Thus, the first groove 27 is disposed to provide the function of elastic cushioning to eliminate tolerances between the first lateral surface 25 and the second lateral surface 26. In the embodiment, the second groove 28 is extended from the rear end 22 toward the front end 21 and located through a part of the first lateral surface 25 and a part of the second lateral surface 26. Preferably but not exclusively, the second groove 28 is located through more than half of the first lateral surface 25 and the half of the second lateral surface 26. Namely, the length of the second groove 28 is greater than one-half of the length of the combination key 20. Thus, the second groove 28 is disposed to provide the function of elastic cushioning to eliminate tolerances between the top surface 23 and the bottom surface 24. In the embodiment, the first groove 27 and the second groove 28 are in communication with each other, but the present disclosure is not limited thereto.

Please refer to FIGS. 4, 9 and 10, again. In the embodiment, the key groove 12 further includes a top wall 12c, a first lateral wall 12a, and a second lateral wall 12b, and the top wall 12c is connected between the first lateral wall 12a and the second lateral wall 12b. When the combination key 20 is at least partially accommodated in the receiving slot 92 and the driving shaft 91 is inserted into the shaft hole 11, the top surface 23 of the combination key 20 abuts against the top wall 12c of the key groove 12, and the first lateral surface 25 and the second lateral surface 26 of the combination key 20 abut against the first lateral wall 12a and the second lateral wall 12b of the key groove 12, respectively. In the embodiment, a shortest distance is formed between the first lateral surface 25 and the second lateral surface 26 of the combination key 20 and adjacent to the front end 21. The shortest distance is less than a distance formed between the first lateral wall 12a and the second lateral wall 12b of the key groove 12. In the embodiment, a longest distance is formed between the first lateral surface 25 and the second lateral surface 26 of the combination key 20 and adjacent to the rear end 22. The longest distance is greater than a distance formed between the first lateral wall 12a and the second lateral wall 12b of the key groove 12. On the other hand, when the combination key 20 is combined with the driving shaft 91 and at least partially accommodated in the receiving slot 92, the distance between the central axis C of the driving shaft 91 and the top surface 23 adjacent to front end 21 of the combination key 20 is less than the distance between the central axis C of the shaft hole 11 and the top wall 12c of the key groove 12. Similarly, the distance between the central axis C of the driving shaft 91 and the top surface 23 adjacent to rear end 22 of the combination key 20 is greater than the distance between the central axis C of the shaft hole 11 and the top wall 12c of the key groove 12.

When the modular motor assembly structure 1 is combined with the application device 90 in the client end, the combination key 20 is partially received in the receiving slot 92 disposed on the driving shaft 91 of the application device 90, the driving shaft 91 is aligned with the shaft hole 11, and the front end 21 of the combination key 20 is aligned with the key groove 12. Then, the driving shaft 91 and together with the combination key 20 are inserted into the shaft hole 11 and the key groove 12, respectively. When the front end 21 of the combination key 20 is placed into the key groove 12, the top surface 23 of the combination key 20 is spaced apart from the top wall 12c of the key groove 12, and the first lateral surface 25 and the second lateral surface 26 of the combination key 20 are spaced apart from the first lateral wall 12a and the second lateral wall 12b of the key groove 12, respectively. In that, the driving shaft 91 and together with the combination key 20 can be inserted into the shaft hole 11 and the key groove 12 smoothly. Thereafter, as the combination key 20 is gradually inserted into the key groove 12, the top surface 23 of the combination key 20 begins to abut against the top wall 12c of the key groove 12, and the first lateral surface 25 and the second lateral surface 26 of the combination key 20 begin to abut against the first lateral wall 12a and the second lateral wall 12b, respectively. When the driving shaft 91 and together with the combination key 20 are completely inserted into the shaft hole 11 and the key groove 12, the combination key 20 is engaged with the key groove 12 firmly. Notably, when the first lateral surface 25 and the second lateral surface 26 of the combination key 20 abut against the first lateral wall 12a and the second lateral wall 12b of the key groove 12, the first groove 27 further provides the function of elastic cushioning to eliminate the size differences of the first lateral surface 25 and the second lateral surface 26 of the combination key 20 with respect to the first lateral wall 12a and the second lateral wall 12b of the key groove 12. The combination key 20 is brought into close engagement with the key groove 12. In addition, when the top surface 23 of the combination key 20 abuts against the top wall 12c of the key groove 12, the second groove 28 provides the function of elastic cushioning to eliminate the size difference of the top surface 23 of the combination key 20 with respect to the top wall 12c of the key groove 12. Thus, when the driving shaft 91 is combined with the combination key 20, it is beneficial to provide ease of guiding assembly, and the driving shaft 91 combined with the combination key 20 can be engaged with the shaft hole 11 and the key groove 12. It is ensured to achieve the function of rigid transmission of rotating power between the application device 90 in the client end and the modular motor assembly structure 1, and provide the function of elastic cushioning to eliminate the problem of assembly tolerances.

Preferably but not exclusively, in order to achieve the forgoing functions, the combination key 20 is completely accommodated within the key groove 12 in the embodiment. In an embodiment, the rear end 22 of the combination key 20 is for example exposed from the key groove 12, and the user can push the top surface 23 adjacent to the rear end 22 to resist the elastic cushioning force of the second groove 28, so that the top surface 23 of the combination key 20 is spaced apart from the top wall 12c of the key groove 12 without being engaged. It is beneficial to slide the driving shaft 91 relative to the shaft hole 11 and further be inserted into or be pulled out of the shaft hole 11. Similarly, the first groove 27 provides the elastic cushioning force with the same feature. The present disclosure is not limited thereto and not redundantly described herein.

Moreover, in the embodiment, the modular motor assembly structure 1 includes for example but not limited to a first conductive component 13 and a second conductive component 14 connected to the main body 10 and configured to transmit power or signal. However, it is not an essential feature to limit the present disclosure, and not redundantly described herein.

Figure 11:
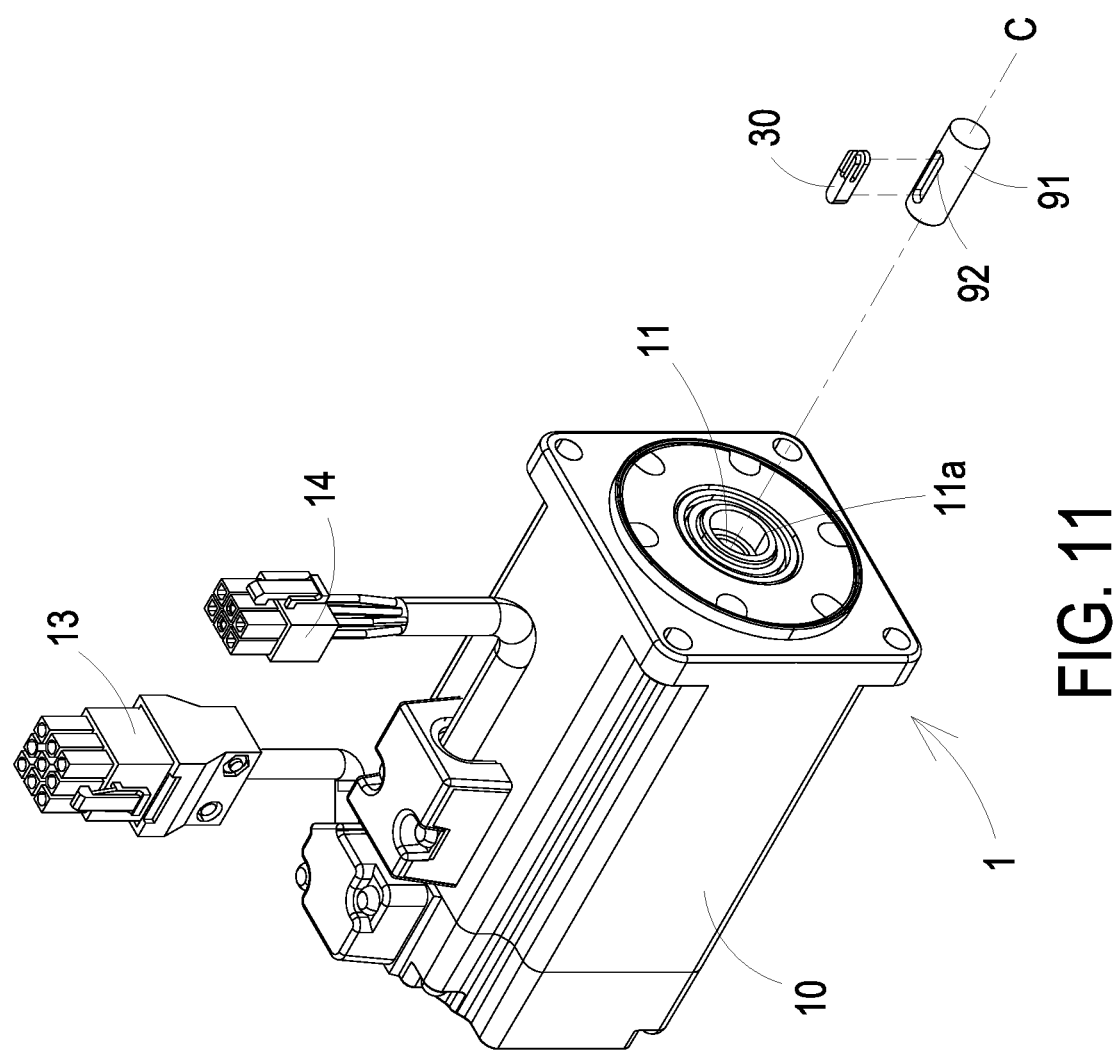
FIG. 11 is a perspective structural view illustrating a modular motor assembly structure and a client application device according to a second preferred embodiment of the present invention.
Figure 12:
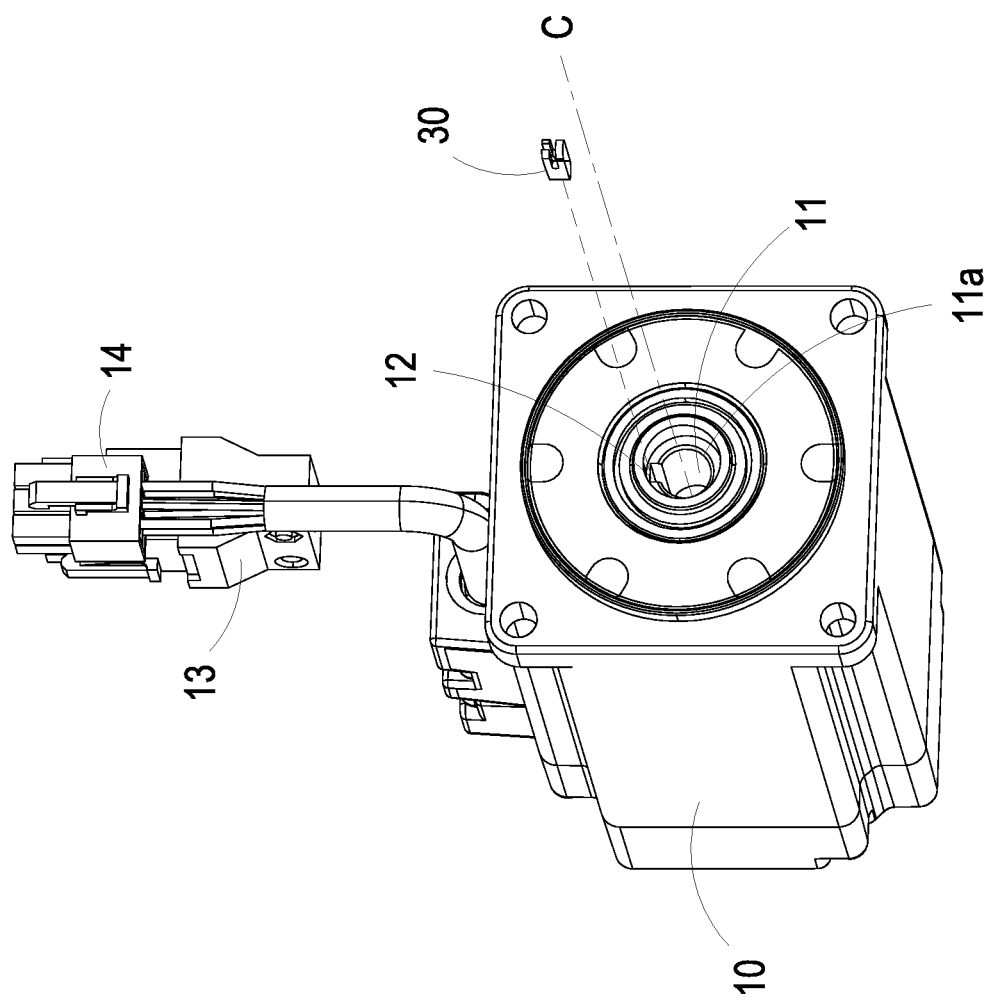
FIG. 12 shows relationship of the main body and the combination key of the modular motor assembly structure according to the second preferred embodiment of the present invention.
Figure 13:
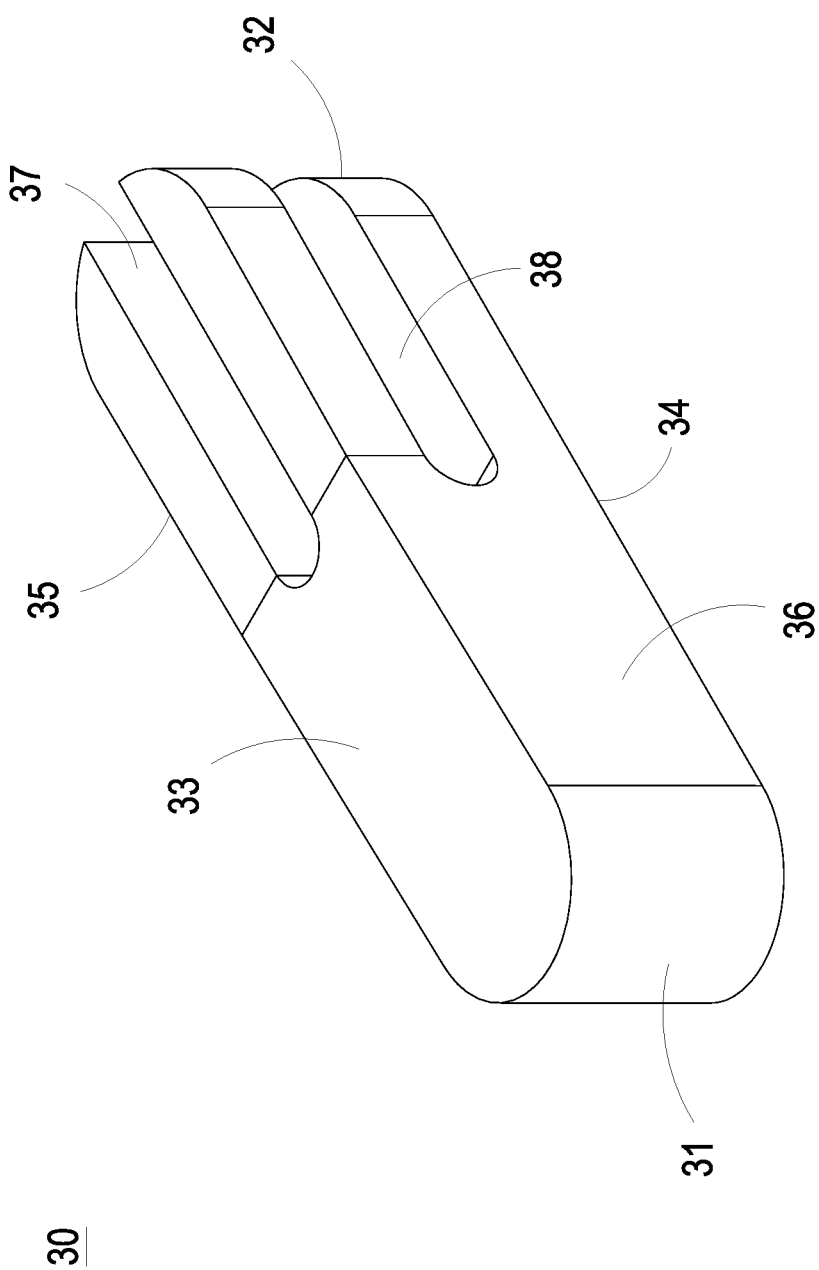
FIG. 13 is a perspective structural view illustrating the combination key of the modular motor assembly structure according to the second preferred embodiment of the present invention.
Figure 14:
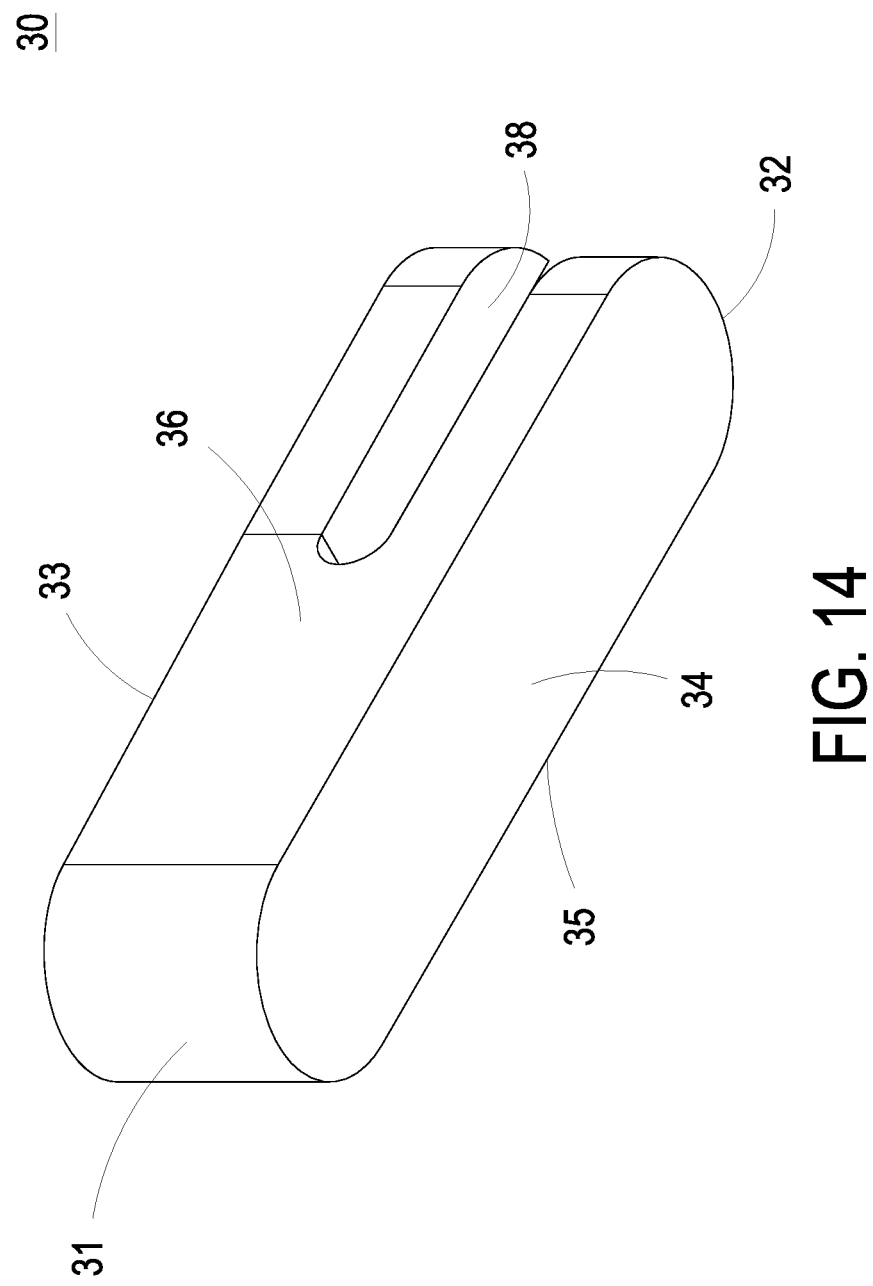
FIG. 14 is a perspective structural view illustrating the combination key of the modular motor assembly structure according to the second preferred embodiment of the present invention and taken at a different observation angle.
Figure 15:
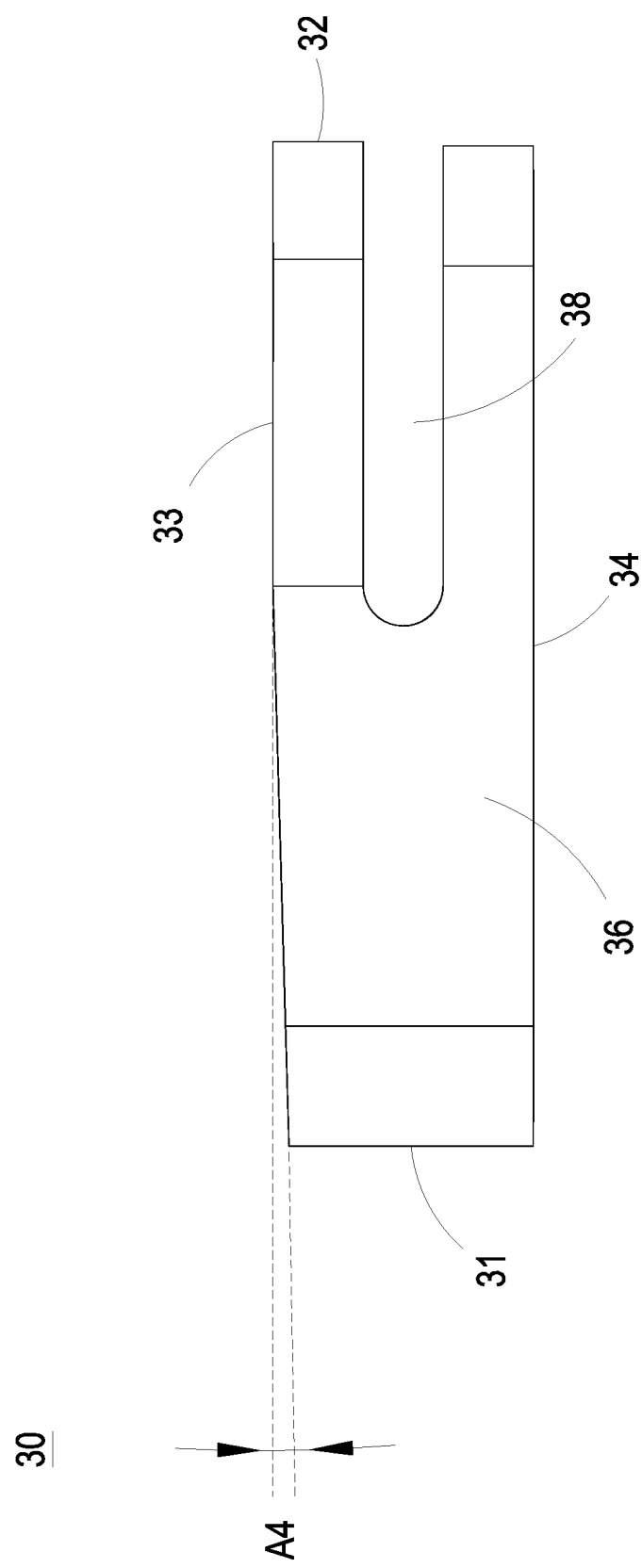
FIG. 15 is a lateral view illustrating the combination key of the modular motor assembly structure according to the second preferred embodiment of the present invention.
Figure 16:
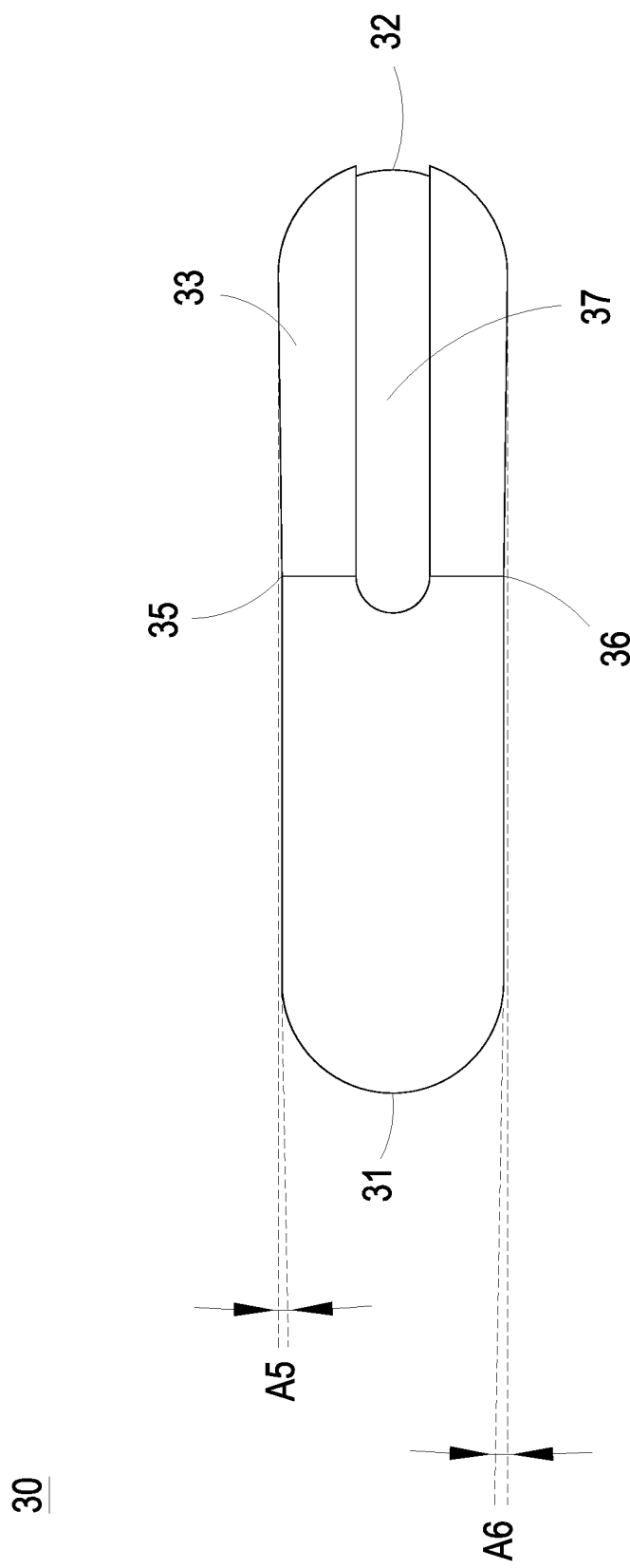
FIG. 16 is a top view illustrating the combination key of the modular motor assembly structure according to the second preferred embodiment of the present invention.
Figure 17:
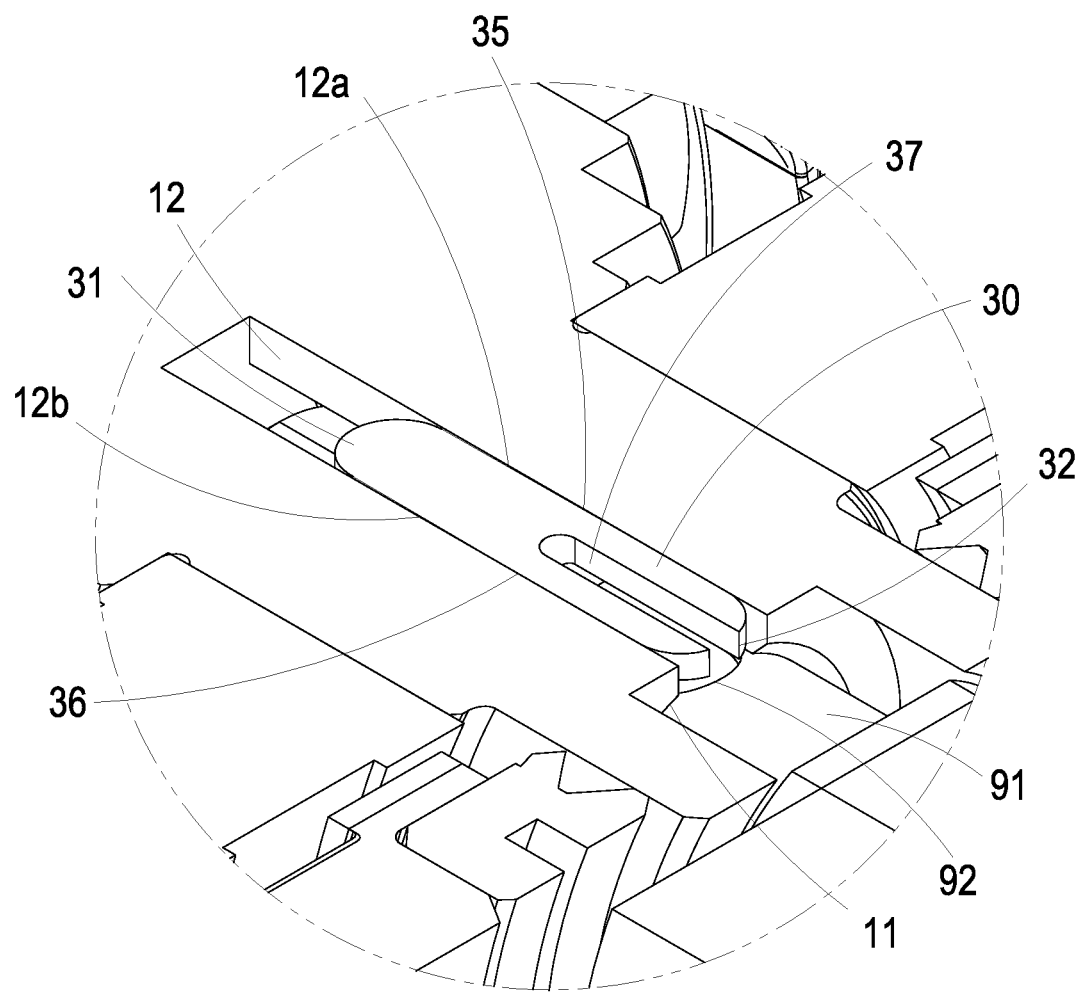
FIG. 17 is a horizontal cross-sectional view illustrating the modular motor assembly structure combined with the corresponding application device according to the second preferred embodiment of the present invention.
Figure 18:
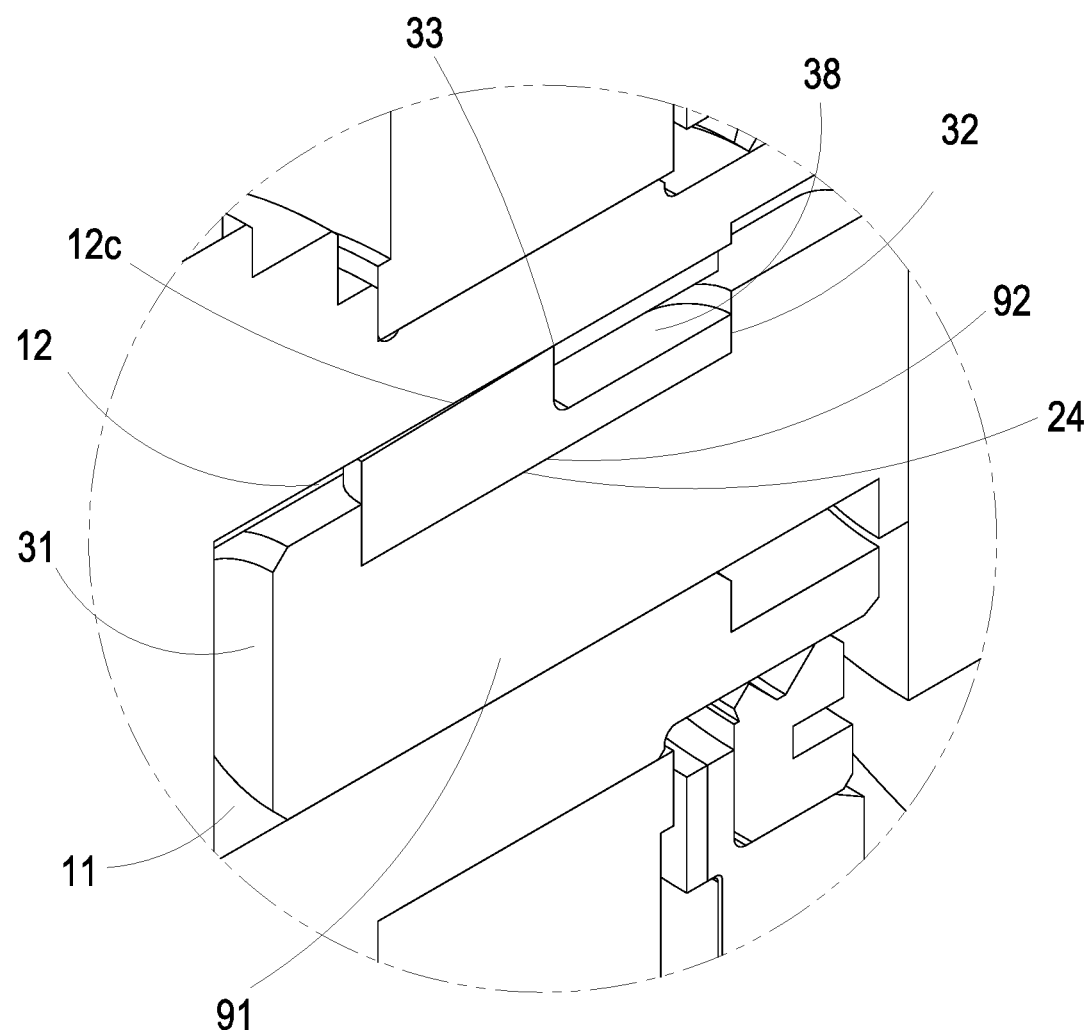
FIG. 18 is a vertical cross-sectional view illustrating the modular motor assembly structure combined with the corresponding application device according to the second preferred embodiment of the present invention.

FIG. 11 is a perspective structural view illustrating a modular motor assembly structure and a client application device according to a second preferred embodiment of the present invention. FIG. 12 shows relationship of the main body and the combination key of the modular motor assembly structure according to the second preferred embodiment of the present invention. FIGS. 13 and 14 are perspective structural views illustrating the combination key of the modular motor assembly structure according to the second preferred embodiment of the present invention. FIGS. 15 and 16 are a lateral view and a top view illustrating the combination key of the modular motor assembly structure according to the second preferred embodiment of the present invention. FIGS. 17 and 18 are a horizontal cross-sectional view and a vertical cross-sectional view illustrating the modular motor assembly structure combined with the corresponding application device according to the second preferred embodiment of the present invention.

In the embodiment, the structures, elements and functions of the modular motor assembly structure 1 and the application device 90 in the client end are similar to those of the modular motor assembly structure 1 and the application device 90 in the client end in FIGS. 1 to 10 (i.e. the first embodiment), and are not redundantly described herein. Different from the modular motor assembly structure 1 in FIGS. 1 to 10, in the embodiment, the combination key 20 of the modular motor assembly structure 1 in the foregoing embodiment is replaced with a combination key 30.

Please refer to FIGS. 13 to 16. In the embodiment, the combination key 30 includes a front end 31, a rear end 32, a top surface 33, a bottom surface 34, a first lateral surface 35, and a second lateral surface 36. The front end 31 and the rear end 32 are opposite to each other. When the combination key 30 combined with the shaft hole 11 and the driving shaft 91, the front end 31 faces the key groove 12. The top surface 33 and the bottom surface 34 are opposite to each other. Preferably but not exclusively, the bottom surface 34 is a flat surface and configured to attach to a bottom of the receiving slot 92 of the driving shaft 91. The first lateral surface 35 and the second lateral surface 36 are opposite to each other and connected between the top surface 33 and the bottom surface 34. In the embodiment, the top surface 33 includes an inclined surface continuously increasing thickness from the front end 31 to the rear end 32, so as to form a fourth inclined angle A4. Namely, the top surface 33 between the front end 31 and rear end 32 is inclined at the fourth inclined angle A4, for example 2°. In addition, the first lateral surface 35 and the second lateral surface 36 include an inclined surface continuously increasing thickness from the front end 31 to the rear end 32, respectively, so as to form a fifth inclined angle A5 and a sixth inclined angle A6. The first lateral surface 35 between the front end 31 and the rear end 32 is inclined at the fifth inclined angle A5, for example 1°. The second lateral surface 36 between the front end 31 and the rear end 32 is inclined at the sixth inclined angle A6, for example 1°. Preferably but not exclusively, the fourth inclined angle A4 is equal to the sum of the fifth inclined angle A5 and the sixth inclined angle A6. The present disclosure is not limited thereto. In other embodiment, the fourth inclined angle A4, the fifth inclined angle A5 and the sixth inclined angle A6 are adjustable according to the practical requirements, and can be formed in partial segmentation of the top surface 33, the first lateral surface 35, and the second lateral surface 36, respectively. The present disclosure is not limited thereto and not redundantly described herein. On the other hand, the combination key 30 further includes a first groove 37 and a second groove 38. The first groove 37 is extended from the rear end 32 toward the front end 31 and located through a part of the top surface 33. Preferably but not exclusively, the first groove 37 is located through about half of the top surface 33. Thus, the first groove 37 is disposed to provide the function of elastic cushioning to eliminate tolerances between the first lateral surface 35 and the second lateral surface 36. Similarly, the second groove 38 is extended from the rear end 32 toward the front end 31 and located through a part of the first lateral surface 35 and a part of the second lateral surface 36. Preferably but not exclusively, the second groove 38 is located through about half of the first lateral surface 35 and the half of the second lateral surface 36. Thus, the second groove 38 is disposed to provide the function of elastic cushioning to eliminate tolerances between the top surface 33 and the bottom surface 34. In the embodiment, the first groove 37 and the second groove 38 are in communication with each other, but the present disclosure is not limited thereto.

On the other hand, in the embodiment, a shortest distance is formed between the first lateral surface 35 and the second lateral surface 36 of the combination key 30 and adjacent to the front end 31. The shortest distance is less than a distance formed between the first lateral wall 12a and the second lateral wall 12b of the key groove 12. In the embodiment, a longest distance is formed between the first lateral surface 35 and the second lateral surface 36 of the combination key 30 and adjacent to the rear end 32. The longest distance is greater than a distance formed between the first lateral wall 12a and the second lateral wall 12b of the key groove 12. On the other hand, when the combination key 30 is combined with the driving shaft 91 and at least partially accommodated in the receiving slot 92, the distance between the central axis C of the driving shaft 91 and the top surface 33 adjacent to front end 31 of the combination key 30 is less than the distance between the central axis C of the shaft hole 11 and the top wall 12c of the key groove 12. Similarly, the distance between the central axis C of the driving shaft 91 and the top surface 33 adjacent to rear end 32 of the combination key 30 is greater than the distance between the central axis C of the shaft hole 11 and the top wall 12c of the key groove 12.

When the modular motor assembly structure 1 is combined with the application device 90 in the client end, the combination key 30 is partially received in the receiving slot 92 disposed on the driving shaft 91 of the application device 90, the driving shaft 91 is aligned with the shaft hole 11, and the front end 31 of the combination key 30 is aligned with the key groove 12. Then, the driving shaft 91 and together with the combination key 30 are inserted into the shaft hole 11 and the key groove 12, respectively. When the front end 31 of the combination key 30 is placed into the key groove 12, the top surface 33 of the combination key 30 is spaced apart from the top wall 12c of the key groove 12, and the first lateral surface 35 and the second lateral surface 36 of the combination key 30 are spaced apart from the first lateral wall 12a and the second lateral wall 12b of the key groove 12, respectively. In that, the driving shaft 91 and together with the combination key 30 can be inserted into the shaft hole 11 and the key groove 12 smoothly. Thereafter, as the combination key 30 is gradually inserted into the key groove 12, the top surface 33 of the combination key 30 begins to abut against the top wall 12c of the key groove 12 to make the top surface 33 of the combination key 30 be forced downwardly. The second groove 38 provides the function of elastic cushioning to eliminate the size difference of the top surface 33 of the combination key 30 with respect to the top wall 12c of the key groove 12, so that the top surface 33 and the top wall 12c are attached to each other. On the other hand, when the first lateral surface 35 and the second lateral surface 36 of the combination key 30 abut against the first lateral wall 12a and the second lateral wall 12b of the key groove 12 to make the first lateral surface 35 and the second lateral surface 36 of the combination key 30 be forced to close. The first groove 37 provides the function of elastic cushioning, so that the first lateral surface 35 and the first lateral wall 12a are attached to each other, and the second lateral surface 36 and the second lateral wall 12b are attached to each other. Thus, the driving shaft 91 and together with the combination key 30 are inserted into the shaft hole 11 and the key groove 12, and engaged with each other firmly. Notably, the dimensional design, the inclined angles, and the arrangement of the grooves of the combination key 30 are adjustable according to the practical requirements. Preferably but not exclusively, the entire structure of the combination key 30 is designed in symmetry. When the modular motor assembly structure 1 is applied to the application device 90 in the client end, the driving shaft 91 can be combined with the different combination key 20 or combination key 30 to assemble. It is benefits to achieve ease of guiding assembly, and the function of rigid transmission of rotating power between the application device 90 in the client end and the modular motor assembly structure 1, and the function of elastic cushioning to eliminate the problem of assembly tolerances.

In summary, the present disclosure provides a modular motor assembly structure. The main body of the modular motor assembly structure is slightly mutated. By modularizing the mounting shaft hole with standard interface size in the motor assembly structure, a wide range of users can directly connect the motor assembly structure with the application device or the equipment. It benefits to meet the requirements of the market and be adjustable according to the existing market. Moreover, the common mounting components, such as the couplings, the motor flanges and so on, are omitted. Thus, the purposes of reducing assembly length and simplifying assembly procedures are achieved. With the geometric profile of the specially designed combination keys, the functions of adjusting the mounting tolerances, facilitating the installation and transmitting the rigidity of rotating power can be achieved. The assembly structure and the assembly method are simplified. The function of the transmitting the rigidity between the modular motor assembly structure and the client application device is achieved. In addition, the special structural design of the combination key can provide the functions of elastic cushioning and adjusting tolerances by disposing the groove and the surface inclined at an angle, which can effectively improve the convenience of assembly, and ensure the functions of rigid connection and elastic cushioning to eliminate the problem of tolerances. Consequently, zero backlash is achieved. It is beneficial to achieve the effects of high precision and rapid response. Thus, the modular motor assembly structure of the present disclosure is more suitable for various rotating components, such as driving screws, pulleys, gears, reducers and so on, in the application device.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A modular motor assembly structure configured to connect to a driving shaft of an application device, wherein the driving shaft comprises a receiving slot, and the modular motor assembly structure comprises:
   a main body comprising:
      a shaft hole spatially corresponding to the driving shaft of the application device and comprising an opening and a central axis, wherein the driving shaft of the application device has an end configured to be inserted into the shaft hole through the opening of the shaft hole along the central axis of the shaft hole; and
      a key groove disposed on a side wall around the shaft hole, in communication with the shaft hole and extended along a direction parallel to the central axis; and
   a combination key spatially corresponding to the receiving slot of the application device and has a front end and a rear end, wherein when the driving shaft is inserted into the shaft hole, the combination key is at least partially accommodated in the receiving slot, and the front end faces the key groove, wherein the combination key has a continuously increasing thickness from the front end to the rear end;
   wherein the combination key comprises a top surface, a bottom surface, a first lateral surface, and a second lateral surface, wherein the first and second lateral surfaces are opposite each other and connected between the top and bottom surfaces; and
   wherein the combination key comprises a first groove extending from one of the front end and the rear end to the other of the rear end and located through the top surface and the bottom surface, and a second groove extending from one of the front end and the rear end to the other of the front end and the rear end and located through the first lateral surface and the second lateral surface.

2. The modular motor assembly structure according to claim 1, wherein the key groove is disposed on a top side wall around the shaft hole.

3. The modular motor assembly structure according to claim 1, wherein the bottom surface is a flat surface and configured to attach to a bottom of the receiving slot of the driving shaft.

4. The modular motor assembly structure according to claim 3, wherein the first lateral surface and the second lateral surface include an inclined surface continuously increasing thickness from the front end to the rear end, respectively, so as to form a second inclined angle and a third inclined angle.

5. The modular motor assembly structure according to claim 3, wherein the combination key comprises a first groove extended from the front end toward the rear end and located through the top surface and the bottom surface.

6. The modular motor assembly structure according to claim 5, wherein the length of the first groove is greater than one-half of the length of the combination key.

7. The modular motor assembly structure according to claim 3, wherein the combination key comprises a second groove extended from the rear end toward the front end and located through the first lateral surface and the second lateral surface.

8. The modular motor assembly structure according to claim 7, wherein the length of the second groove is greater than one-half of the length of the combination key.

9. The modular motor assembly structure according to claim 3, wherein the combination key comprises a first groove extended from the rear end toward the front end and located through the top surface.

10. The modular motor assembly structure according to claim 3, wherein the combination key comprises a first groove and a second groove, wherein the first groove is extended from the front end toward the rear end and located through the top surface and the bottom surface, wherein the second groove is extended from the rear end toward the front end and located through the first lateral surface and the second lateral surface, and the first groove and the second groove are in communication with each other.

11. The modular motor assembly structure according to claim 3, wherein the combination key comprises a first groove and a second groove, wherein the first groove is extended from the rear end toward the front end and located through the top surface, wherein the second groove is extended from the rear end toward the front end and located through the first lateral surface and the second lateral surface, and the first groove and the second groove are in communication with each other.

12. The modular motor assembly structure according to claim 3, wherein the key groove comprises a top wall, a first lateral wall and a second lateral wall, and the top wall is connected between the first lateral wall and the second lateral wall, wherein when the combination key is at least partially accommodated in the receiving slot and the driving shaft is inserted into the shaft hole, the top surface of the combination key abuts against the top wall of the key groove, and the first lateral surface and the second lateral surface of the combination key abut against the first lateral wall and the second lateral wall of the key groove, respectively.

13. The modular motor assembly structure according to claim 12, wherein a shortest distance is formed between the first lateral surface and the second lateral surface of the combination key and adjacent to the front end, wherein the shortest distance is less than a distance formed between the first lateral wall and the second lateral wall of the key groove.

14. The modular motor assembly structure according to claim 12, wherein a longest distance is formed between the first lateral surface and the second lateral surface of the combination key and adjacent to the rear end, wherein the longest distance is greater than a distance formed between the first lateral wall and the second lateral wall of the key groove.

15. The modular motor assembly structure according to claim 12, wherein when the combination key is at least partially accommodated in the receiving slot, the distance between a central axis of the driving shaft and the top surface adjacent to front end of the combination key is less than the distance between the central axis of the shaft hole and the top wall of the key groove.

16. The modular motor assembly structure according to claim 12, wherein when the combination key is at least partially accommodated in the receiving slot, the distance between a central axis of the driving shaft and the top surface adjacent to rear end of the combination key is greater than the distance between the central axis of the shaft hole and the top wall of the key groove.

* * * * *